(12) United States Patent
Lindstrand et al.

(10) Patent No.: US 9,194,526 B2
(45) Date of Patent: Nov. 24, 2015

(54) FLOW CONTROL

(75) Inventors: Per-Ake Lindstrand, Kristianstad (SE); Fredrik Karlsson, Hyssna (SE); Lars Schack, Fjalkinge (SE)

(73) Assignee: Varmebaronen AB, Kristianstad (SE)

( * ) Notice: Subject to any disclaimer, the term of this patent is extended or adjusted under 35 U.S.C. 154(b) by 341 days.

(21) Appl. No.: 13/825,833

(22) PCT Filed: Oct. 20, 2010

(86) PCT No.: PCT/SE2010/051131
§ 371 (c)(1),
(2), (4) Date: May 6, 2013

(87) PCT Pub. No.: WO2012/053949
PCT Pub. Date: Apr. 26, 2012

(65) Prior Publication Data
US 2013/0220464 A1    Aug. 29, 2013

(51) Int. Cl.
*F16L 55/027*    (2006.01)
*F16N 27/00*    (2006.01)
(Continued)

(52) U.S. Cl.
CPC .............. *F16L 55/027* (2013.01); *F24H 1/181* (2013.01); *F24H 9/0015* (2013.01); *F24H 9/124* (2013.01); *F28F 27/00* (2013.01); *F24D 3/082* (2013.01); *F24D 2200/32* (2013.01); *F28D 2020/0069* (2013.01)

(58) Field of Classification Search
CPC ... F16L 55/027; F16L 55/04; F16L 55/02763; F15B 2201/205; F24H 1/181; F24H 9/0015; F24H 9/124; F28F 27/00; F24D 3/082; F24D 2200/32; F24F 27/00; F28D 2020/0069

USPC .................. 138/26–31, 37–42, 114; 366/337
See application file for complete search history.

(56) References Cited

U.S. PATENT DOCUMENTS 1,042,171 A * 10/1912 Talansier ........................ 138/40
2,490,493 A * 12/1949 Wade .............................. 138/26
(Continued)

FOREIGN PATENT DOCUMENTS

DE    197 03 724    7/1998
DE    297 23 274    9/1998
(Continued)

*Primary Examiner* — Patrick F Brinson
*Assistant Examiner* — Matthew Lembo
(74) *Attorney, Agent, or Firm* — Tarolli, Sundheim, Covell & Tummino LLP

(57) ABSTRACT

The invention relates to a flow control (1) for reducing the flow velocity of a liquid heating medium flowing into an accumulator tank (2) or a boiler. The flow control (1) comprises an inner tubular member (5) and an outer cylindrical member (6), The inner tubular member (5) has an inlet opening (8) and at least one outlet opening (9). A deflector means (10) deflects the flow of liquid heating medium out of the inner tubular member through said outlet opening. A perforated member (12) covers the outlet opening (9) such that the flow of liquid heating medium from said outlet opening passes through said perforated member. The outer cylindrical member (6) comprises a solid part (14) and a perforated part (15). The outer cylindrical member (6) is positioned such that the solid part (14) deflects the flow of liquid heating medium from said inner tubular member towards the perforated part (15) of the outer cylindrical member and through that into the accumulator tank (2) or boiler.

20 Claims, 5 Drawing Sheets

(51) Int. Cl.
*F24H 1/18* (2006.01)
*F24H 9/00* (2006.01)
*F24H 9/12* (2006.01)
*F28F 27/00* (2006.01)
*F24D 3/08* (2006.01)
*F28D 20/00* (2006.01)

(56) References Cited

U.S. PATENT DOCUMENTS

| | | | | |
|---|---|---|---|---|
| 2,878,835 | A * | 3/1959 | Peterson | 138/30 |
| 3,322,154 | A * | 5/1967 | Mercier | 138/30 |
| 3,726,475 | A | 4/1973 | Eising | |
| 3,741,250 | A * | 6/1973 | Mercier | 138/30 |
| 3,744,527 | A * | 7/1973 | Mercier | 138/30 |
| 3,783,938 | A * | 1/1974 | Chartet | 165/166 |
| 3,822,725 | A * | 7/1974 | Zirps | 138/28 |
| 4,027,407 | A * | 6/1977 | Kiss | 37/321 |
| 4,043,539 | A * | 8/1977 | Gilmer et al. | 366/340 |
| 4,610,369 | A * | 9/1986 | Mercier | 220/721 |
| 4,638,838 | A * | 1/1987 | Richard et al. | 138/30 |
| 4,759,387 | A * | 7/1988 | Arendt | 138/30 |
| 6,123,108 | A * | 9/2000 | Chen et al. | 138/30 |
| 6,510,819 | B1 | 1/2003 | Pollock et al. | |
| 7,055,586 | B2 * | 6/2006 | Sakakibara et al. | 165/158 |
| 2009/0007980 | A1 * | 1/2009 | Hall et al. | 138/126 |
| 2011/0240161 | A1 * | 10/2011 | Schneider et al. | 138/30 |

FOREIGN PATENT DOCUMENTS

| | | |
|---|---|---|
| EP | 0 683 362 | 11/1995 |
| EP | 0928940 | 7/1999 |
| FR | 2 873 190 | 1/2006 |
| JP | 59086847 | 5/1984 |
| JP | 2006 57916 | 3/2006 |

* cited by examiner

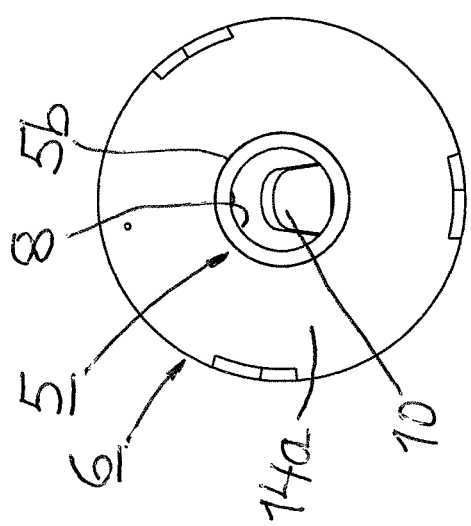

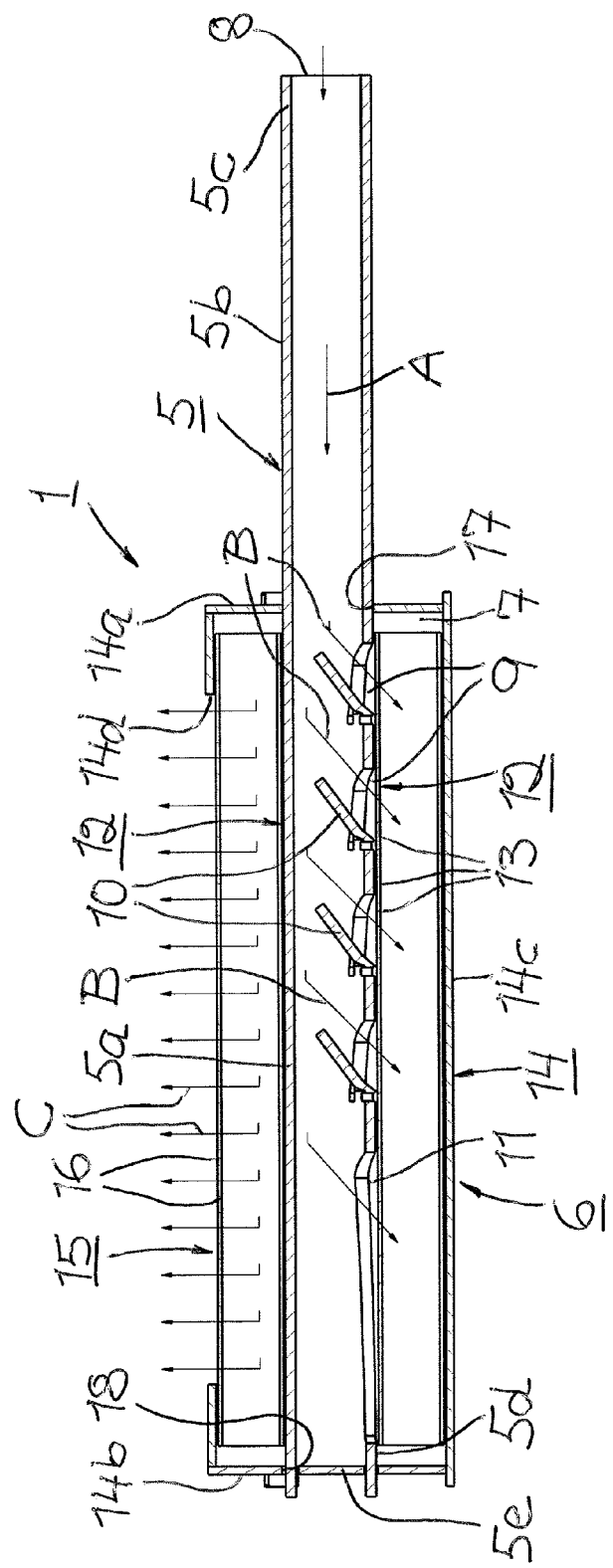

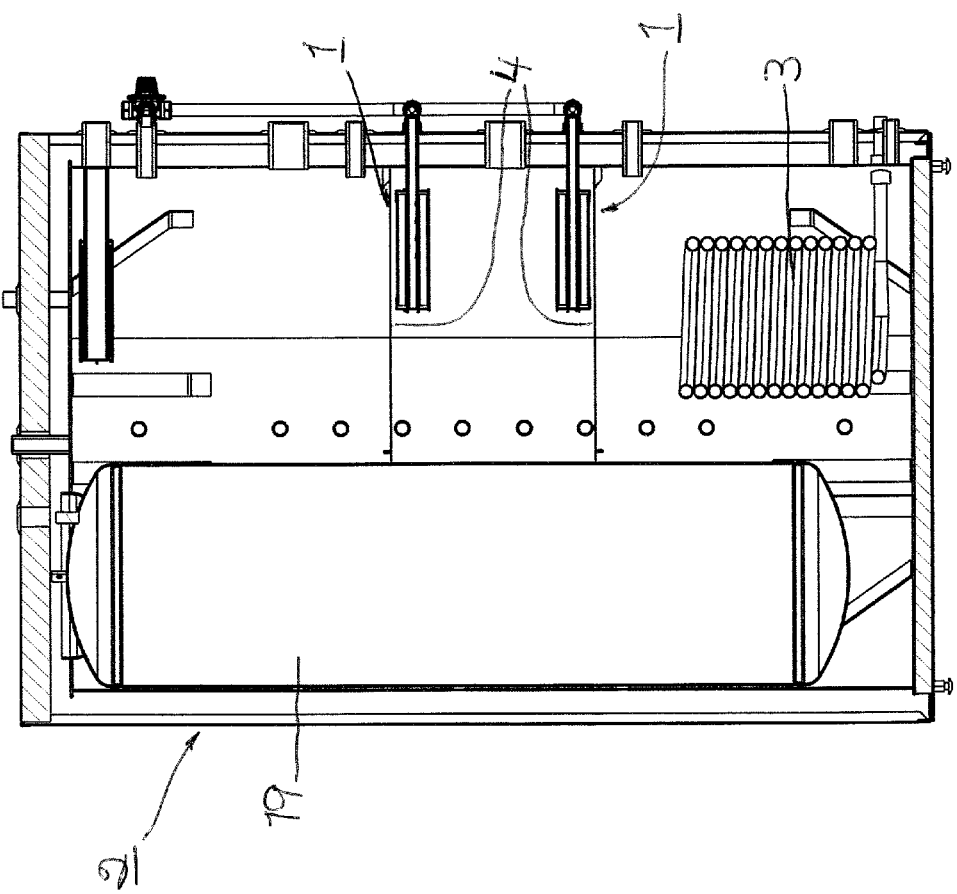

FLOW CONTROL

TECHNICAL FIELD

The present invention relates to a flow control in an accumulator tank or a boiler for a heating system for reducing the flow velocity of a liquid heating medium flowing into the accumulator tank or boiler.

BACKGROUND OF THE INVENTION

Irrespective of whether the accumulator tanks or boilers for a heating system are connected to one or more heating sources with liquid heating media, it is often important that the layer formation of the heating medium or media from said one or more heating sources in the accumulator tank or boiler is not disturbed. Optimum layer formation is namely the primary condition for good economy and efficient function of the accumulator tank.

SUMMARY OF THE INVENTION

It is therefore an object of the present invention to provide a flow control which in an accumulator tank or a boiler is capable of reducing the flow velocity of the liquid heating media flowing into the accumulator tank or boiler and thereby reduce the turbulence of the liquid heating media and, as a consequence thereof, improve layer formation of the heating medium or media from one or more different heating sources.

This is achieved according to the present invention by providing a flow control as defined above, wherein the flow control comprises an inner, substantially tubular member and an outer, substantially cylindrical member which defines a space for accommodating at least a part of said inner tubular member, wherein the inner tubular member is configured with an inlet opening at one end thereof for liquid flowing into the accumulator tank or boiler and at least one outlet opening in a side wall thereof, wherein a deflector means is provided in the inner tubular member at the outlet opening for deflecting the flow of liquid out of the inner tubular member through said outlet opening, wherein a perforated member is provided on the inner tubular member covering at least the outlet opening such that the flow of liquid deflected through said outlet opening passes through perforations in said perforated member, wherein the outer cylindrical member comprises a solid part and a perforated part, and wherein the outer cylindrical member is positioned around the inner tubular member such that the solid part thereof is located substantially opposite to the outlet opening in the inner tubular member for deflecting the flow of liquid from said inner tubular member towards the perforated part of the outer cylindrical member and through perforations therein into the interior of the accumulator tank or boiler.

BRIEF DESCRIPTION OF THE DRAWINGS

The present invention will be further described below by way of example only and with reference to the accompanying drawings, in which FIG. 3 is an end view of the flow control of FIGS. 1 and 2, FIG. 4 is a sectional side view along the line A-A of the flow control of FIG. 3, and FIG. 5 is a schematic sectional view of an accumulator tank with a plurality of flow controls according to FIG. 1-4.

DETAILED DESCRIPTION OF PREFERRED EMBODIMENTS

Figure 1:
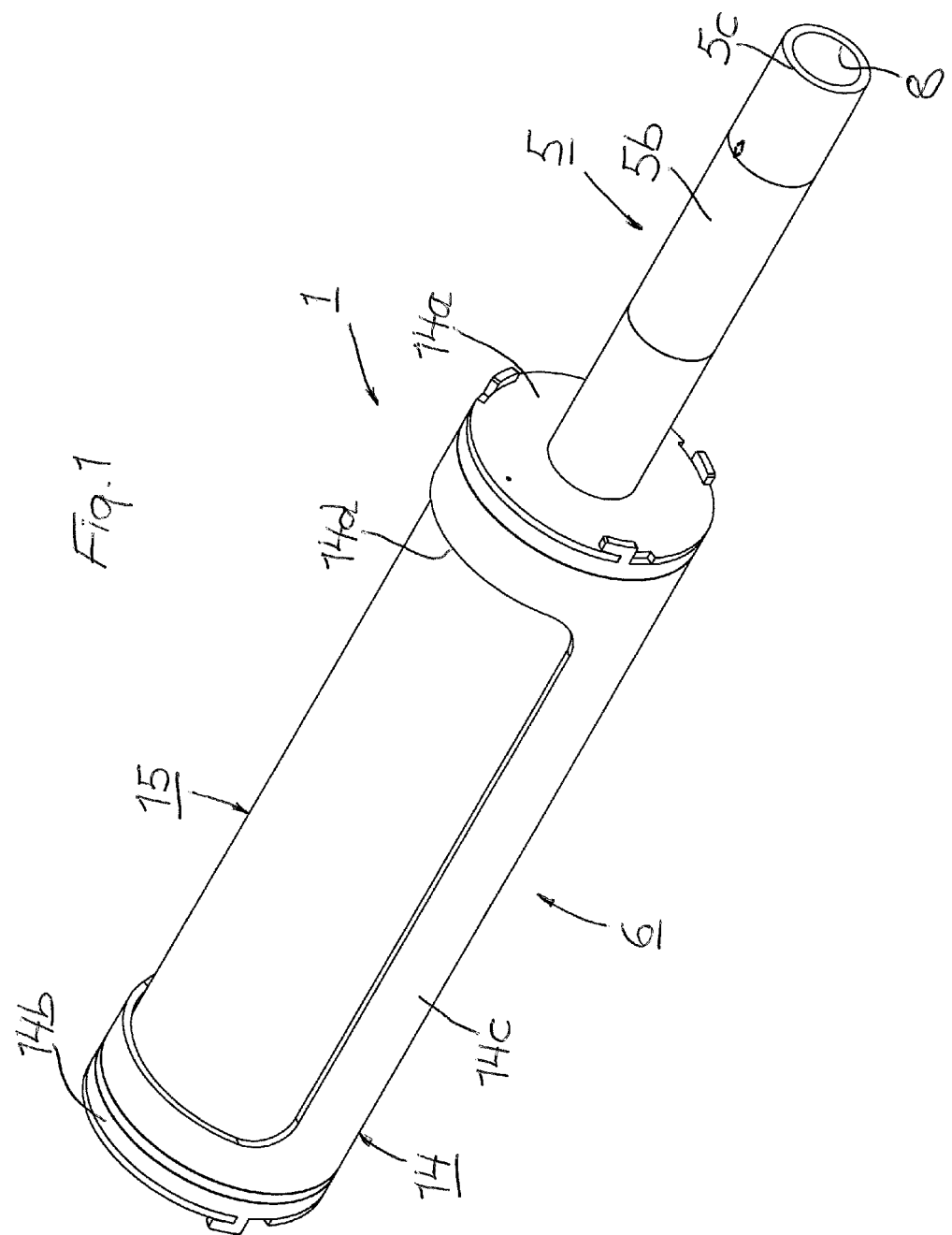
FIG. 1 is a schematic perspective view of a flow control according to the invention.

As is apparent from FIG. 5, a flow control 1 according to the present invention is adapted for use in an accumulator tank 2 for a heating system with a liquid as heating media. It should be emphasized however, that the flow control 1 according to the present invention may also be used in a boiler of a suitable type for one or more heating sources with liquid heating media. Accordingly, as in the illustrated embodiment, the accumulator tank 2 may be used in connection with solar collectors and is as such e.g. provided with a built-in coil 3 of e.g. cupper for heat transfer from the solar collectors. The accumulator tank 2 may also be used in connection with oil-, wood- or pellet-fired heating sources (heating boilers), in connection with electrical heating sources or in connection with heat pumps or combinations thereof. When combined, the accumulator tank 2 is often provided with separating plates 4 for separating the various parts of the space of the accumulator tank which receive the liquid heating media from the different heating sources. This is done in an attempt to try to keep the liquid heating media from the different heating sources separated from each other or at least assist in this separation or layer formation, because said heating media have different temperatures when they reach the accumulator tank 2 and it is desirable to support or maintain the layer formation these differences in temperature give rise to. Thus, as in the illustrated embodiment, there may be one part 2a of the space at the bottom of the accumulator tank 2 which is provided with the coil 3 because the liquid heating media received in this part of the tank has the lowest temperature. This part 2a is indirectly cooled by water flowing into a water heater 19. Other parts 2b and 2c of the space above the part 2a with the coil 3 receive liquids of higher temperature and each such part is separated from other parts by a separating plate 4. The part 2b in the middle is intended for heat pumps or other heating sources. This part 2b may be provided with two flow controls, one connected to the return flow from the 10 heating system and the other to hot water from e.g. a heat pump. The upper part 2c is intended for heating sources such as the oil-, wood- or pellet-fired heating sources mentioned above, The inflow from these heating sources may be connected to a flow control at the top of the accumulator tank 2.

Although the accumulator tank 2 described above is adapted for connection to more than one heating source, it is obvious, as indicated above, that the space in the accumulator tank can be adapted for connection to only one heating source and consequently be provided with only one or, if desired, more than one flow control 1. In such an accumulator tank 2, no separating plate 4 is needed.

The isolated accumulator tank 2 illustrated in FIG. 5 comprises further components such as electric connections, thermometers and the above-mentioned water heater 19, but since these components do not form part of the present invention, they are not further described here.

Each flow control 1 in the accumulator tank 2 of FIG. 5 is configured for reducing the flow velocity of the liquid heating medium flowing into the accumulator tank, and by doing this, reduce the turbulence of the liquid heating medium when entering the accumulator tank and thereby improve the layer formation of the one or more liquid heating media therein.

Figure 2:
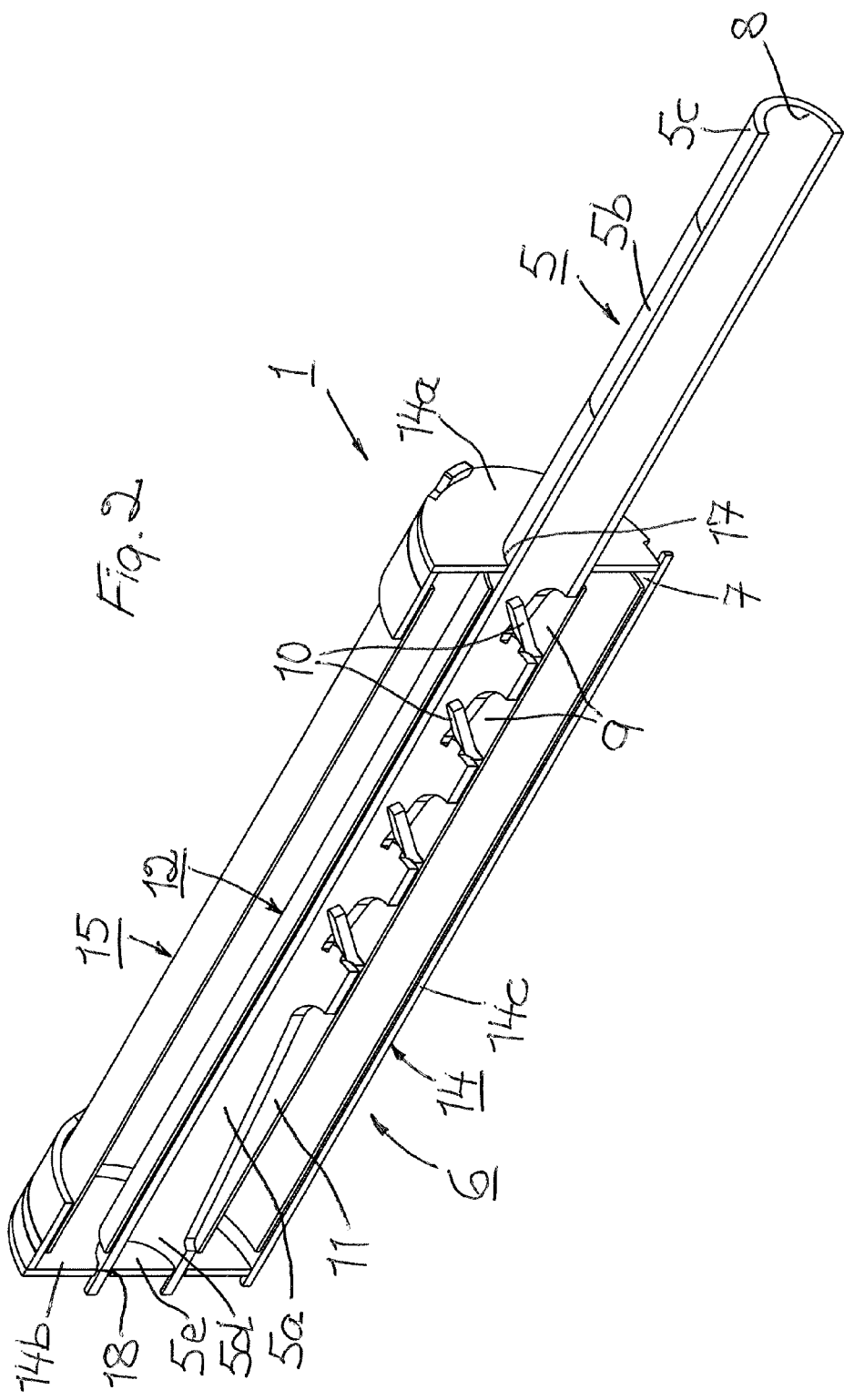
FIG. 2 is a schematic sectional view in perspective of the flow control of FIG. 1.

Each flow control 1 in the accumulator tank 2 of FIG. 5 is configured as illustrated in FIG. 1-4. Accordingly, the flow control 1 comprises an inner, substantially tubular member 5 and an outer, substantially cylindrical member 6. The outer cylindrical member 6 defines a space 7 for accommodating at least a part 5a of the inner tubular member 5. In the illustrated embodiment, a part 5b of the inner tubular member 5 is located outside the outer cylindrical member 6. The length of this part 5b may vary substantially. It may, if present, as in the illustrated embodiment, constitute almost half of the entire length of the inner tubular member 5 or be formed only by an end portion of said inner tubular member. In the illustrated embodiment, the inner tubular member 5 is positioned concentrically within the outer cylindrical member 6 and it has a diameter which is substantially less, e.g. about ⅓, of the diameter of the outer cylindrical member 6, such that there is, relatively seen, sufficient space between the outer side of the inner tubular member and the inner side of the outer cylindrical member for the intended operation of the flow control 1.

The inner tubular member 5 is at one end 5c thereof configured with an inlet opening 8 for a liquid heating medium flowing from a heating source into the accumulator tank 2 (in the direction of arrows A in FIG. 4). It is this end 5c with the inlet opening 8 which in the illustrated embodiment protrudes out of the outer cylindrical member 6. The inner tubular member 5 is further configured with at least one outlet opening 9 in a side wall thereof. A deflector means 10 is provided in the inner tubular member 5 at the outlet opening 9 for deflecting the flow of liquid heating medium out of the inner tubular member through said outlet opening (in the direction of arrows B in FIG. 4). Although one outlet opening 9 and associated deflector means 10 may suffice for the intended operation, the flow control 1 may, as in the illustrated embodiment, comprise an inner tubular member 5 with a plurality of outlet openings 9, and a deflector means 10 may be provided in the inner tubular member at each outlet opening for deflecting the flow of liquid heating medium out of the inner tubular member through the respective outlet opening. In the illustrated embodiment (FIGS. 2 and 4), there are provided four outlet openings 9 and four deflector means 10. Said plurality of outlet openings 9 and associated deflector means 10 are provided in line with each other in the longitudinal direction of the inner tubular member 5. If desired however, the outlet openings 9 and associated deflector means 10 may be arranged in other ways, e.g. such that a zigzag-shaped flow path is formed between the deflector means 10 in the inner tubular member 5.

Each deflector means is in the illustrated embodiment configured as a tongue 10 protruding from the side wall at the outlet opening 9 and into the interior of the inner tubular member 5. The tongue 10 is configured to protrude into the interior of the inner tubular member 5, leaving a gap to the side wall opposite to the associated outlet opening 9 of e.g. about 4 mm. This distance may vary, based on e.g. the overall size of the flow control and its members. The angle of protrusion of the tongues 10 into the inner tubular member 5 may also vary. The tongue 10 consists of a strip of the material of the inner tubular member 5 which has been punched or cut out from said inner tubular member at three sides when providing the outlet opening 9 and which then has been bent inwards in the inner tubular member along a fourth side. Correct positioning of the tongue 10 relative to the outlet opening 9 is thereby achieved. The tongue 10 and associated outlet opening 9 have in this illustrated embodiment substantially the same shape. However, the outlet opening 9 and the tongue 10 may be shaped differently and the shapes or designs thereof are adapted based on the desired function of the flow control 1. Furthermore, the tongue 10 may be provided or mounted in correct position inside the inner tubular member 5 in any other suitable way than punching or cutting.

The inner tubular member 5 may further be configured with at least one elongated outlet opening 11 at a closed end 5d of said inner tubular member opposite to said one end 5c with the inlet opening 8. The elongated outlet opening 11 is provided in the side wall of the inner tubular member 5 such that the closed end 5d thereof deflects the remaining flow of liquid heating medium out of the inner tubular member through said elongated outlet opening. The elongated outlet opening 11 is provided in the side wall of the inner tubular member 5 in line with the or all other outlet openings 9 therein. Although any desired shape of the elongated outlet opening 11 is possible, said elongated outlet opening is in the illustrated embodiment configured tapering towards the closed end 5d of the inner tubular member 5. If desired, more than one elongated outlet opening 11 may be provided at the closed end 5d of the inner tubular member 5. The size of the elongated outlet opening 11 may also vary. The elongated outlet opening 11 may e.g., as in the illustrated embodiment, be larger than the or each of all other outlet openings 9 in the inner tubular member 5.

A perforated member 12 with perforations 13 is provided on the outer side of the inner tubular member 5. This perforated member 12 is configured such that is covers at least the outlet opening or openings 9 in the inner tubular member 5 and, if present, the elongated outlet opening 11. Thereby, the flow of liquid heating medium deflected through said outlet opening or openings 9, 11 passes through the perforations 13 which are provided in said perforated member 12. The perforated member is in the illustrated embodiment a net-like member 12 with mesh-like perforations 13, but may of course have any other suitable structure which is capable of letting the liquid heating medium pass through the perforations 13 therein such that the flow velocity of said liquid heating medium is reduced. The net-like member 12 is configured to surround the inner tubular member 5 along the length thereof provided with the outlet openings 9, 11. Since the outlet openings 9, 11 are all found in that part of the inner tubular member 5 which is located within the outer cylindrical member 6, there is no need to cover the part of the inner tubular member located outside said outer cylindrical member.

The outer cylindrical member 6 of the flow control 1 comprises a solid part 14 without perforations and a perforated part 15 with perforations 16. The outer cylindrical member 6 is positioned around the inner tubular member 5 such that the solid part 14 thereof is located substantially opposite to the outlet opening or openings 9 and, if present, the elongated outlet opening 11 in said inner tubular member. With this arrangement of the outer cylindrical member 6 relative to the inner tubular member 5, the flow of liquid heating medium from said inner tubular member is deflected by the solid part 14 of the outer cylindrical member towards the perforated part 15 thereof and through the perforations 16 therein into the interior 2a, 2b, 2c of the accumulator tank 2 (in the direction of arrows C in FIG. 4). Thereby, the flow velocity of said liquid heating medium is further reduced. The flow velocity is now reduced to such an extent that when the liquid heating medium enters into the accumulator tank 2, the flow of said liquid heating medium will generate no substantial turbulence in the accumulator tank and will therefore not substantially affect or disturb the layer formation of one or more liquid heating media with varying temperature therein.

The perforated part of the outer cylindrical member 6 is in the illustrated embodiment a net-like part 15 with mesh-like perforations 16, but may of course have any other suitable structure which is capable of letting the liquid heating medium pass through the perforations 16 therein.

In order to achieve optimum deflection of the flow of liquid heating medium from the inner tubular member 5 towards the perforated part 15 of the outer cylindrical member 6 and in order to provide a sufficient large area for the liquid heating medium to flow through the perforations 16 in the perforated part without increasing the velocity of said heating medium, the solid part 14 of the outer cylindrical member 6 defines a larger portion of the peripheral surface of the outer cylindrical member than the perforated part 15, i.e. the solid part of the outer cylindrical member constitutes e.g. about 200° of the periphery of the outer cylindrical member and the perforated part e.g. about 160° of the periphery of the outer cylindrical member. The solid part 14 of the outer cylindrical member 6 also comprises end portions 14a and 14b, whereby said solid part defines, together with the perforated part 15, the space 7 for accommodating the inner tubular member 5. One of the end portions 14a of the outer cylindrical member 6 is configured with an opening 17 through which the end 5c of the inner tubular member 5 configured with the inlet opening 8 protrudes out of said outer cylindrical member. This end 5c of the inner tubular member 5 may be releasably locked in said opening 17 in a suitable manner. The closed end 5d of the inner tubular member 5 may be defined by providing the end portion 14b of the outer cylindrical member 6 opposite to said end portion 14a with an opening 17 of said outer cylindrical member as a closed end portion. The closed end 5d of the inner tubular member 5 may also be defined by an end wall 5e in said tubular member. Said closed end 5d of the inner tubular member 5 may then protrude out through an opening 18 in the end portion 14b of the outer cylindrical member 6 and be releasably locked therein in a suitable manner for easy mounting and demounting of the inner tubular member in the outer cylindrical member 6. The end portions 14a, 14b of the solid part 14 of the outer cylindrical member 6 may be releasably attached to the remaining portion 14c of said solid part 14 for easy mounting and demounting of the flow control 1. Furthermore, as in the illustrated embodiment, the solid part 14 may itself have a substantially cylindrical shape with an opening 14d therein for the perforated part 15.

The flow control 1 defined above is e.g. of a metal or a metallic material capable of withstanding the environment in an accumulator tank 2 for heating systems. It is however also possible to manufacture the flow control 1 in other suitable materials, e.g. plastics or plastic materials which also are capable of withstanding the environment in an accumulator tank 2 for heating systems.

It should once again be emphasized that the flow control according to the present invention may be used not only in separate accumulator tanks, but also in boilers of various types forming part of a heating system.

It will be evident to a skilled person that the flow control according to the present invention may be modified within the scope of the subsequent claims without departing from the idea and purpose of the invention. Accordingly, the flow control described above may comprise inner tubular members and outer cylindrical members which are shaped differently as shown. Thus, said members need not be circular as shown in the drawings, but may have any other suitable shape which does not impair the intended operation of the flow control. The relative size of said inner tubular member and said outer cylindrical member may be different from what is described above and illustrated in the drawings. As mentioned previously, the shape and arrangement of the outlet opening or openings and associated deflector means as well as of the elongated outlet opening or openings may be different from what is shown and described above. The relative size and design of the solid and perforated parts of the outer cylindrical member of the flow control may be different from what is described above and illustrated in the drawings.

The invention claimed is:

1. Flow control in an accumulator tank or a boiler for a heating system for reducing the flow velocity of a liquid heating medium flowing into the accumulator tank or boiler, wherein the flow control (1) comprises an inner substantially tubular member (5) and an outer substantially cylindrical member (6) which defines a space (7) for accommodating at least a part (5a) of said inner tubular member, the inner tubular member (5) is at one end (5c) thereof configured with an inlet opening (8) for a liquid heating medium flowing into the accumulator tank (2) or boiler and at least one outlet opening (9) in a side wall thereof, a deflector means (10) is provided in the inner tubular member (5) at the outlet opening (9) for deflecting the flow of liquid heating medium out of the inner tubular member through said outlet opening, a perforated member (12) is provided on the inner tubular member (5) covering at least the outlet opening (9) such that the flow of liquid heating medium deflected through said outlet opening passes through perforations (13) in said perforated member, the outer cylindrical member (6) comprises a solid part (14) and a perforated part (15), and the outer cylindrical member (6) is positioned around the inner tubular member (5) such that the solid part (14) thereof is located substantially opposite to the outlet opening (9) in the inner tubular member for deflecting the flow of liquid heating medium from said inner tubular member towards the perforated part (15) of the outer cylindrical member and through perforations (16) therein into the interior (2a, 2b, 2c) of the accumulator tank (2) or boiler.

2. Flow control according to claim 1, wherein the inner tubular member (5) is positioned concentrically within said outer cylindrical member (6).

3. Flow control according to claim 1, wherein the inner tubular member (5) is configured with a plurality of outlet openings (9), and a deflector means (10) is provided in the inner tubular member (5) at each outlet opening (9) for deflecting the flow of liquid heating medium out of the inner tubular member through the respective outlet opening.

4. Flow control according to claim 3, wherein said plurality of outlet openings (9) and associated deflector means (10) are aligned with each other in the longitudinal direction of the inner tubular member (5).

5. Flow control according to claim 1, wherein the inner tubular member (5) is further configured with at least one elongated outlet opening (11) at a closed end (5d) of said inner tubular member opposite to said one end (5c) with the inlet opening (8).

6. Flow control according to claim 5, wherein the elongated outlet opening (11) is provided in the side wall of the inner tubular member (5) such that the closed end (5d) thereof deflects the flow of liquid heating medium out of the inner tubular member through said elongated outlet opening.

7. Flow control according to claim 5, wherein the elongated outlet 15 opening (11) is provided in the side wall of the inner tubular member (5) aligned with the outlet openings (9) in the longitudinal direction.

8. Flow control according to claim 5, wherein the elongated outlet opening (1) is configured tapering towards the closed end (5d) of the inner tubular member (5).

9. Flow control according to claim 1, wherein the deflector means is configured as a tongue (10) protruding from the side wall at the outlet opening (9) and into the interior of the inner tubular member (5).

10. Flow control according to claim 9, wherein the tongue (10) is configured to protrude into the interior of the inner tubular member (5), leaving a gap to the side wall opposite to the associated outlet opening (9) of about 4 mm.

11. Flow control according to claim 9, wherein the tongue (10) is integral with the inner tubular member (5) and has been punched or cut out from said inner tubular member at three sides when providing the outlet opening and which then has been bent inwards in the inner tubular member along a fourth side.

12. Flow control according to claim 1, wherein the perforated member on the inner tubular member is a net-like member (12) with mesh-like perforations (13).

13. Flow control according to claim 12, wherein the net-like member (12) is configured to surround the inner tubular member (5) along the length thereof provided with the outlet openings (9, 11).

14. Flow control according to claim 1, wherein the perforated part of the outer cylindrical member (6) is a net-like part (15) with mesh-like perforations (16).

15. Flow control according to claim 1, wherein the solid part (14) of the outer cylindrical member (6) is defined by about 200° of the periphery and by end portions (14a, 14b) of said outer cylindrical member, and that the perforated part (15) is defined by about 160° of the periphery of the outer cylindrical member (6).

16. Flow control according to claim 15, wherein one of the end portions (14a) of the outer cylindrical member (6) is configured with an opening (17) through which the end (5c) of the inner tubular member (5) configured with the inlet opening (8) protrudes out of said outer cylindrical member.

17. Flow control according to claim 15, wherein the closed end (5d) of the inner tubular member (5) is defined by an end portion (14b) of the outer cylindrical member (6) opposite to said end portion (14a) with an opening (17) of said outer cylindrical member being closed.

18. Flow control according to claim 1, wherein the diameter of the inner tubular member (5) is less than the diameter of the outer cylindrical member (6).

19. Accumulator tank for a heating system, comprising one or more flow controls (1) according to claim 1.

20. Boiler for a heating system, comprising one or more flow controls (1) according to claim 1.

\* \* \* \* \*